United States Patent
Gao et al.

(10) Patent No.: US 11,398,233 B2
(45) Date of Patent: Jul. 26, 2022

(54) SMART SERVICE METHOD, APPARATUS AND DEVICE

(71) Applicant: Baidu Online Network Technology (Beijing) Co., Ltd., Beijing (CN)

(72) Inventors: Cong Gao, Beijing (CN); You Luo, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 196 days.

(21) Appl. No.: 16/857,257

(22) Filed: Apr. 24, 2020

(65) Prior Publication Data
US 2021/0043203 A1    Feb. 11, 2021

(30) Foreign Application Priority Data
Aug. 9, 2019  (CN) .......................... 201910735702.7

(51) Int. Cl.
G10L 15/22          (2006.01)
G10L 15/08          (2006.01)
(Continued)

(52) U.S. Cl.
CPC .............. *G10L 15/22* (2013.01); *G10L 15/08* (2013.01); *G10L 25/21* (2013.01); *G10L 25/84* (2013.01);
(Continued)

(58) Field of Classification Search
CPC ......... G10L 15/22; G10L 15/08; G10L 25/21; G10L 25/84
See application file for complete search history.

(56) References Cited

U.S. PATENT DOCUMENTS 9,271,111 B2   2/2016  Blanksteen
10,546,583 B2 * 1/2020  White .................... G10L 15/22
(Continued)

FOREIGN PATENT DOCUMENTS

CN   103023681 A   4/2013
CN   104618440 A   5/2015
(Continued)

OTHER PUBLICATIONS

Office Action for corresponding Japanese patent application (three pages).
(Continued)

*Primary Examiner* — Paras D Shah
(74) *Attorney, Agent, or Firm* — Harness, Dickey & Pierce, P.L.C.

(57) ABSTRACT

The embodiments of the present disclosure provides a smart service method, apparatus and device, the method includes: a first device plays response information corresponding to an awaking word after receiving the awaking word; when the first device determines that a second device in an awake state exists in a device group that the first device is in, the first device transmits operation information of the first device to the second device, and receives operation information of the second device transmitted by the second device; the first device determines, according to the operation information of the first device and the operation information of the second device a target device from the first device and the second device, where the target device is a device in the device group to provide a smart service. The service resources are economized.

19 Claims, 6 Drawing Sheets

(51) Int. Cl.
*G10L 25/21* (2013.01)
*G10L 25/84* (2013.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 10,878,812 B1* | 12/2020 | Helwani | G10L 15/28 |
| 10,909,983 B1* | 2/2021 | Peng | G10L 15/22 |
| 11,132,989 B2* | 9/2021 | Tolomei | G10L 15/08 |
| 2010/0216402 A1* | 8/2010 | Appleby | H04L 67/52 |
| | | | 455/41.3 |
| 2016/0170735 A1 | 6/2016 | Kuo | |
| 2017/0064634 A1* | 3/2017 | Van Horn | H04W 52/0209 |
| 2017/0242651 A1* | 8/2017 | Lang | G06F 3/165 |
| 2018/0061419 A1* | 3/2018 | Melendo Casado | G10L 15/22 |
| 2018/0233137 A1* | 8/2018 | Torok | G06F 3/167 |
| 2019/0355365 A1* | 11/2019 | Kim | G10L 17/12 |
| 2019/0385594 A1* | 12/2019 | Park | G10L 15/083 |
| 2019/0392834 A1* | 12/2019 | Yi | G10L 15/08 |
| 2020/0043490 A1* | 2/2020 | Park | G06F 3/167 |
| 2020/0066279 A1* | 2/2020 | Kang | G10L 15/32 |
| 2020/0135194 A1* | 4/2020 | Jeong | G10L 15/22 |
| 2020/0258513 A1* | 8/2020 | Smith | H04R 3/005 |
| 2020/0342869 A1* | 10/2020 | Lee | G10L 25/60 |
| 2020/0349940 A1* | 11/2020 | Ko | G10L 15/26 |

FOREIGN PATENT DOCUMENTS

| | | |
|---|---|---|
| CN | 105094968 A | 11/2015 |
| CN | 108337601 A | 7/2018 |
| CN | 109391528 A | 2/2019 |
| JP | 2016502192 A | 1/2016 |
| WO | WO-2013/106539 A1 | 7/2013 |
| WO | 2018/213323 A1 | 11/2018 |

OTHER PUBLICATIONS

Notice of Allowance for corresponding Japanese patent application No. 2020-019056 dated Aug. 3, 2021, three pages.

* cited by examiner

SMART SERVICE METHOD, APPARATUS AND DEVICE

CROSS-REFERENCE TO RELATED APPLICATIONS

This application claims priority to Chinese Patent Application No. 201910735702.7, filed on Aug. 9, 2019, which is hereby incorporated by reference in its entirety.

TECHNICAL FIELD

Embodiments of the present disclosure relate to the computer field and, more particularly, to a smart service method, apparatus and device.

BACKGROUND

With the development of artificial intelligence technology, smart devices (for example, smart speakers and smart robots, etc.) are more and more widely used.

Currently, multiple smart devices may be placed in various application scenarios (for example, a home scenario, a conference scenario, etc.). A smart device can be awoken by the voice of a user, and provide a smart service for the user. When multiple smart devices are set in an scenario, after a user vocalizing an awaking word (for example, Xiaodu), the multiple smart devices in the application scenario may all be awoken, and the multiple smart devices may all provide a service to the user, which resulting in a waste of service resources.

SUMMARY

Embodiments of the present disclosure provide a smart service method, apparatus and device, which economizes service resources.

In a first aspect, the embodiments of the present disclosure provide a smart service method, including:

playing, by a first device, response information corresponding to an awaking word, after receiving the awaking word;

when the first device determines that a second device in an awake state exists in a device group that the first device is in, transmitting, by the first device, operation information of the first device to the second device, and receiving operation information of the second device transmitted by the second device; and determining, by the first device, according to the operation information of the first device and the operation information of the second device, a target device from the first device and the second device, where the target device is a device in the device group to provide a smart service.

In a possible implementation, where, for any one of the first device and the second device, operation information of a device includes at least one of the following information:

first indication information, where the first indication information is used to indicate whether the device is providing a smart service;

second indication information, where the second indication information is used to indicate whether the device provided a smart service within a first preset time interval; and a signal-to-noise ratio and/or a power value when receiving the awaking word.

In a possible implementation, where the determining, by the first device, according to the operation information of the first device and the operation information of the second device, a target device from the first device and the second device, includes:

determining, by the first device, according to the operation information of the first device and the operation information of the second device, whether a device which is providing a smart service exists in the first device and the second device; and if a device which is providing a smart service exists in the first device and the second device, determining the device which is providing a smart service from the first device and the second device as the target device;

if a device which is providing a smart service does not exist in the first device and the second device, determining, according to the operation information of the first device and the operation information of the second device, whether a device which has provided a smart service within the first preset time interval exists in the first device and the second device, if a device which has provided a smart service within the first preset time interval exists in the first device and the second device, determining the device which has provided a smart service within the first preset time interval as the target device, if a device which has provided a smart service within the first preset time interval does not exist in the first device and the second device, determining the device with the highest signal-to-noise ratio and/or the power value when receiving the awaking word as the target device from the first device and the second device.

In a possible implementation, where the determining, by the first device, a device in the first device and the second device which is providing a smart service as the target device, includes:

if the number of the device which is providing a smart service in the first device and the second device is one, determining, by the first device, the device which is providing a smart service as the target device;

if the number of devices which are providing a smart service in the first device and the second device is more than one, determining, by the first device, a device with the highest signal-to-noise ratio and/or the power value when receiving the awaking word, from the devices which are providing a smart service, as the target device.

In a possible implementation, where the determining, by the first device, a device which has provided a smart service within the first preset time interval as the target device, includes:

if the number of the device which has provided a smart service within the first preset time interval is one, determining, by the first device, the device which has provided a smart service within the first preset time interval as the target device;

if the number of devices which have provided a smart service within the first preset time interval is more than one, determining, by the first device, the device with the highest signal-to-noise ratio and/or the power value when receiving the awaking word, from the devices which have provided a smart service, as the target device.

In a possible implementation, where the first device determines that a second device in an awake state exists in a device group that the first device is in, includes:

transmitting, by the first device, a request message to other device in the device group; and if a response message is received by the first device within a second preset time interval, determining, by the first device, that a second device in the awake state exists in the device group that the first device is in.

In a possible implementation, where the second device is a device that transmits the response message to the first device within the second preset time interval.

In a possible implementation, where after the determining, by the first device, according to the operation information of the first device and the operation information of the second device, a target device from the first device and the second device, further including:

if the first device is the target device, receiving, by the first device, a smart service request message input by a user, and providing a smart service to the user according to the smart service request message;

if the first device is not the target device, switching, by the first device, a device state to a stand-by state.

In a possible implementation, where after the determining, by the first device, according to the operation information of the first device and the operation information of the second device, a target device from the first device and the second device, further including:

if the first device is the target device, outputting, by the first device, guidance information, where the guidance information is used to indicate: the first device and the second device both received the awaking word and played the response information corresponding to the awaking word, and the first device is to provide a smart service.

In a second aspect, the embodiments of the present disclosure provide a smart service apparatus, which is applied to a first device, including a playing module, a transmitting module, a receiving module and a first determining module, where, the playing module is configured to play response information corresponding to an awaking word, after the awaking word is received;

the transmitting module is configured to, when it is determined that a second device in an awake state exists in a device group that the first device is in, transmit operation information of the first device to the second device;

the receiving module is configured to, when it is determined that a second device in an awake state exists in a device group that the first device is in, receive operation information of the second device transmitted by the second device; and the first determining module is configured to determine, according to the operation information of the first device and the operation information of the second device, a target device from the first device and the second device, where the target device is the device in the device group to provide a smart service.

In a possible implementation, where, for any one of the first device and the second device, operation information of a device includes at least one of the following information:

first indication information, where the first indication information is used to indicate whether the device is providing a smart service;

second indication information, where the second indication information is used to indicate whether the device provided a smart service within a first preset time interval; and a signal-to-noise ratio and/or a power value when receiving the awaking word.

In a possible implementation, where the first determining module is specifically configured to:

determine, according to the operation information of the first device and the operation information of the second device, whether a device which is providing a smart service exists in the first device and the second device; and if a device which is providing a smart service exists in the first device and the second device, determine, the device which is providing a smart service from the first device and the second device as the target device;

if a device which is providing a smart service does not exist in the first device and the second device, determine, according to the operation information of the first device and the operation information of the second device, whether a device which has provided a smart service within the first preset time interval exists in the first device and the second device, if a device which has provided a smart service within the first preset time interval exists in the first device and the second device, determine the device which has provided a smart service within the first preset time interval as the target device, if a device which has provided a smart service within the first preset time interval does not exist in the first device and the second device, determine the device with the highest signal-to-noise ratio and/or the power value when receiving the awaking word as the target device from the first device and the second device.

In a possible implementation, where the first determining module is specifically configured to:

if the number of the device which is providing a smart service in the first device and the second device is one, determine the device which is providing a smart service as the target device;

if the number of devices which are providing a smart service in the first device and the second device is more than one, determine, a device with the highest signal-to-noise ratio and/or the power value when receiving the awaking word, from the devices which are providing a smart service, as the target device.

In a possible implementation, where the first determining module is specifically configured to:

if the number of the device which has provided a smart service within the first preset time interval is one, determine the device which has provided a smart service within the first preset time interval as the target device;

if the number of devices which have provided a smart service within the first preset time interval is more than one, determine, the device with the highest signal-to-noise ratio and/or the power value when receiving the awaking word, from the devices which have provided a smart service, as the target device.

In a possible implementation, the apparatus further includes a second determining module, where, the transmitting module is further configured to transmit a request message to other device in the device group; and the second determining module is configured to, if a response message is received by the receiving module within a second preset time interval, determine that a second device in the awake state exists in the device group that the first device is in.

In a possible implementation, where the second device is a device that transmits the response message to the first device within the second preset time interval.

In a possible implementation, the apparatus further includes a switching module, where, the receiving module is further configured to, if the first device is the target device, receive a smart service request message input by a user, and provide a smart service to the user according to the smart service request message; and the switching module is configured to, if the first device is not the target device, switch a device state to a stand-by state.

In a possible implementation, the apparatus further includes an output module, where, the output module is configured to, after the first determining module determines, according to the operation information of the first device and the operation information of the second device, a target device from the first device and the second device, if the first device is the target device, output guidance information, where the guidance information is used to indicate: the first device and the second device both received the awaking word and played the response information corresponding to the awaking word, and the first device is to provide a smart service.

In a third aspect, the embodiments of the present disclosure provide a smart service apparatus, including: at least one processor and a memory, where, the memory storing thereon computer executable instructions;

the at least one processor is configured to execute the instructions to implement the smart service method according to any one of the first aspect and possible implementations of the first aspect.

In a fourth aspect, the embodiments of the present disclosure provide a computer-readable storage medium, storing thereon computer executable instructions which, when being executed by a processor, implement the smart service method according to any one of the first aspect and possible implementations of the first aspect.

According to the smart service method, apparatus and device provided in the embodiments of the present disclosure, the first device plays the response information corresponding to the awaking word after receiving the awaking word, when the first device determines that a second device in the awake state exists in the device group that the first device is in, the first device transmits the operation information of the first device, and receives the operation information of the second device transmitted by the second device, the first device determines, according to the operation information of the first device and the operation information of the second device, a target device from the first device and the second device, and a smart service is provided by the target device. In the above process, multiple devices in the device group, after being awoken simultaneously by the awaking word, may intercommunicate to determine one target device, and the smart service is provided by the one target device to a user, instead of being provided by the multiple smart devices awoken simultaneously to the user. In this way, not only the resources are economized, but also the service interference, which is caused when multiple smart devices provide smart services simultaneously to a user, is avoided.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and those ordinary skilled in the art may still derive other drawings from these accompanying drawings without creative efforts.

DESCRIPTION OF EMBODIMENTS

In order to make objectives, technical solutions and advantages of the embodiments of the present disclosure clearer, the technical solution of the embodiments of the present disclosure will be described in detail below, in conjunction with accompanying drawings. Apparently, the described embodiments are part rather than all of the embodiments of the present disclosure. Based on the embodiments of the present disclosure, all the other embodiments obtained by those of ordinary skill in the art without creative efforts are within the protection scope of the present disclosure.

Figure 1:
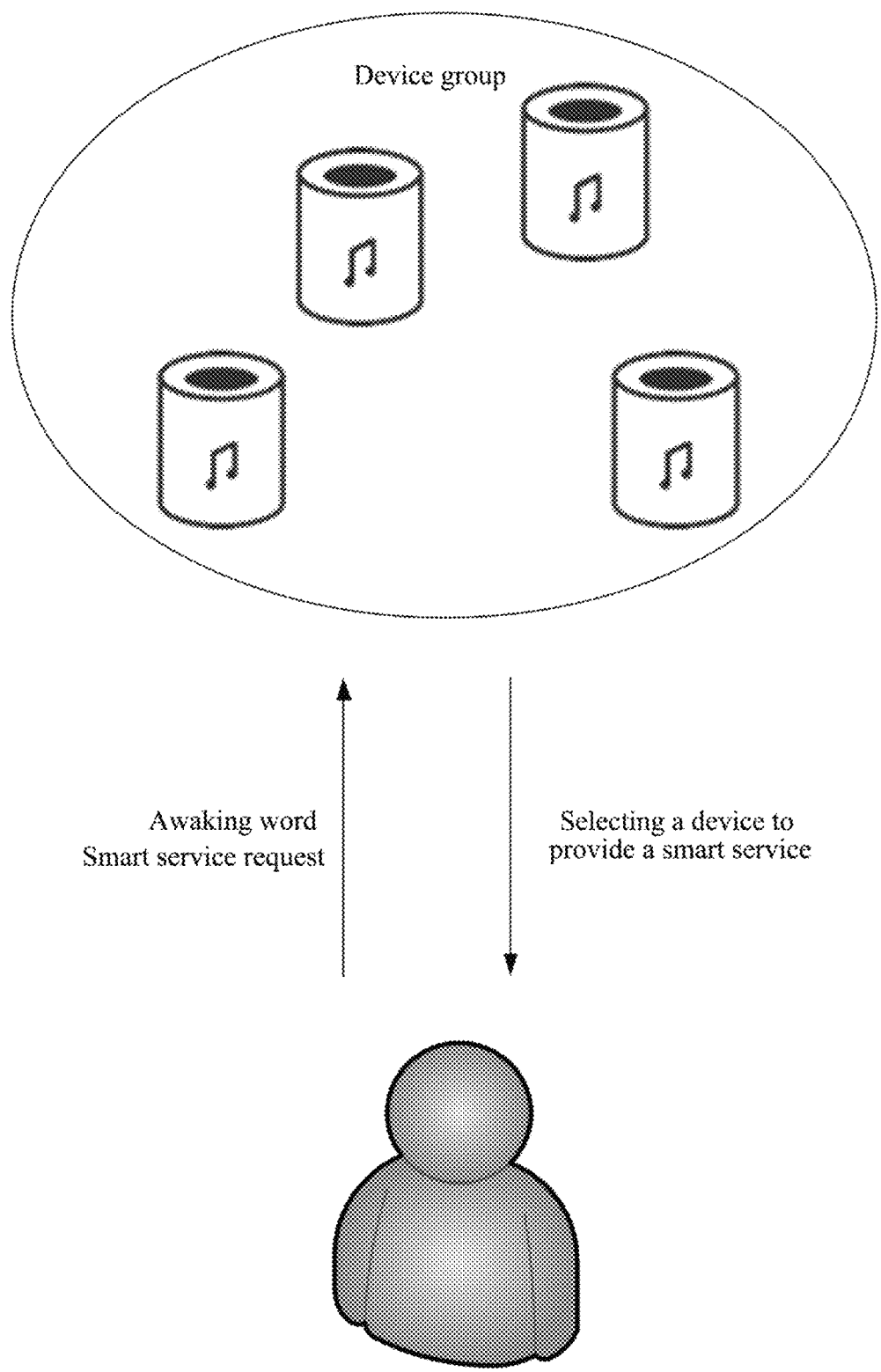
FIG. 1 is an illustration of an application scenario of a smart service method provided by an embodiment of the present disclosure.

FIG. 1 is an illustration of an application scenario of a smart service method provided by an embodiment of the present disclosure. Referring to FIG. 1, multiple smart devices may be deployed in an application scenario (for example, a home scenario, a conference scenario, etc.), the multiple smart devices may form a device group, and any two smart devices in the device group may intercommunicate. Since the smart devices in the device group are located in the same application scenario, multiple devices in the device group may be awoken after an awaking word being vocalized by a user. After being awoken simultaneously, the multiple smart devices may intercommunicate to select a target device from the multiple smart devices, the smart service is provided by the target device to the user, instead of being provided by the multiple smart devices awoken simultaneously to the user. In this way, not only the resources are economized, but also the service interference, which is caused when multiple smart devices provide the smart services simultaneously to a user, is avoided.

It should be noted that, FIG. 1 merely illustrates an application scenario as an example. The method illustrated in the present disclosure may also be applied to other scenarios of Duer Operating System (OS) Collaborative Interactive (DCI), which is not specifically limited in the embodiments of the present disclosure.

In the following, the technical solutions of the present disclosure is elaborated in detail through specific embodiments. It should be noted that, the following embodiments may be combined with each other, the same or similar content may not be described repeatedly in different embodiments.

Figure 2:
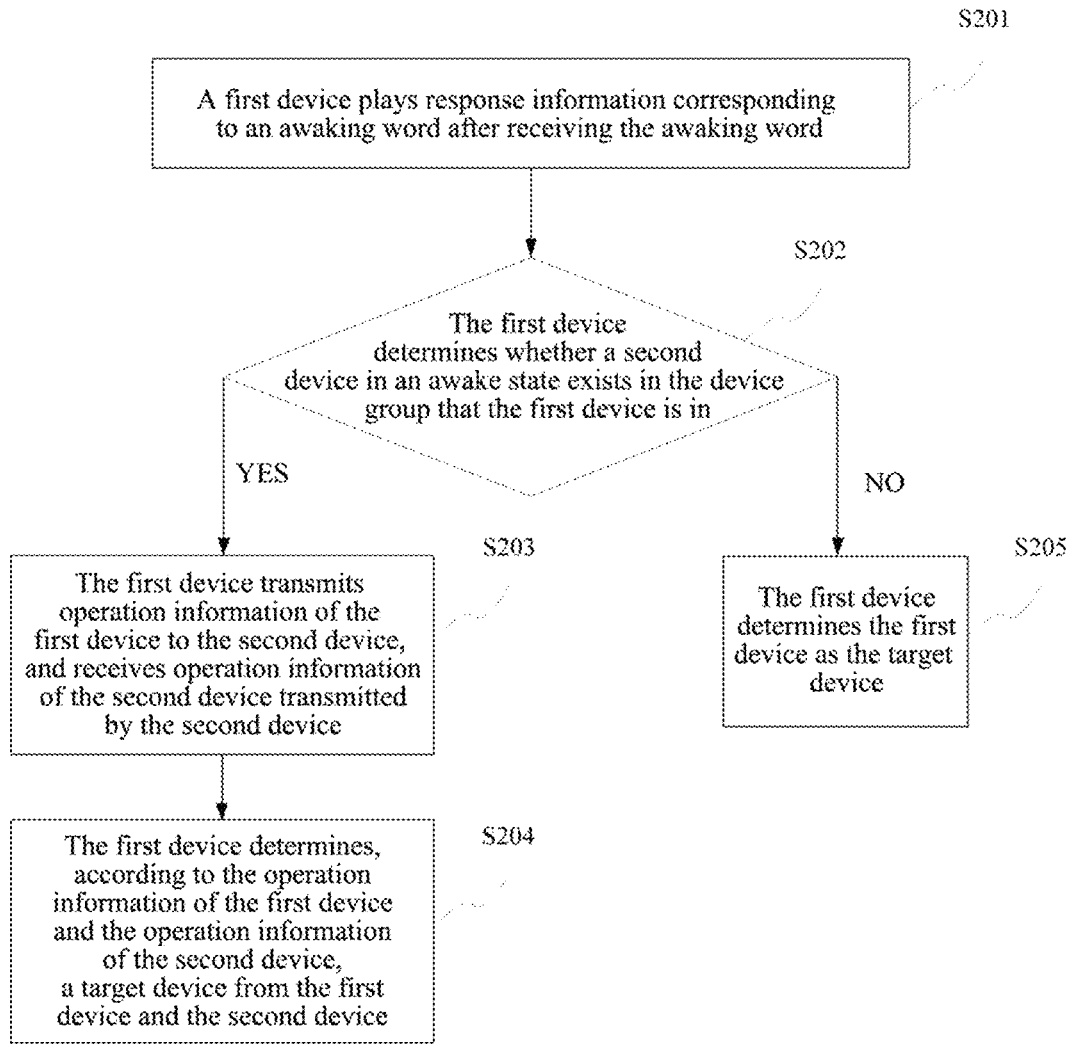
FIG. 2 is a schematic flowchart of a smart service method provided by an embodiment of the present disclosure.

FIG. 2 is a schematic flowchart of a smart service method provided by an embodiment of the present disclosure. Referring to FIG. 2, the method may include:

S201, a first device plays response information corresponding to an awaking word after receiving the awaking word.

The first device may be any device in a device group, the device group includes at least two smart devices. The device group may be preset by a user. For example, devices logged with the same account may be determined as a device group.

It should be noted that, all the devices in the device group carry out the implementation shown in FIG. 2 with the same process. The embodiments of the present disclosure is illustrated with the execution process of the first device as an example.

Where the first device is a smart device. For example, the first device may be a smart speaker, a smart robot or the like.

The awaking word, which may be a word preset by a user, is used to awake the devices in the device group. The device in the device group has a stand-by state and an awake state. Awaking a device in the device group is directed to switching the device to the awake state. The awaking word may be words vocalized by a user, for example, the awaking word may be "hey, Xiaodu", "Xiaodu, Xiaodu" or the like. In a practical application, the awaking word may be set according to practical needs, which is not specifically limited in the embodiments of the present disclosure.

After receiving the awaking word, if the first device is in the awake state, the first device will play response information corresponding to the awaking word. After receiving the awaking word, if the first device is in the stand-by state, the first device will switch the device state to the awake state first and then play the response information corresponding to the awaking word which, for example, may be "here", "Xiaodu received it" or the like. The response information may be set according to practical needs.

It should be noted that, other devices in the device group, after receiving the awaking word, will also play the response information corresponding to the awaking word, such that the user may know clearly which devices are awake, in this way, the user may know clearly whether a device is faulty.

S202, the first device determines whether a second device in the awake state exists in the device group that the first device is in.

If yes, executes S203-S204.

If no, executes S205.

In a possible implementation, the first device may determine, whether a second device in the awake state exists in the device group that the first device is in, by means of the following feasible implementations.

The first device transmits a request message to other device in the device group, and determines whether a response message is received within a second preset time interval. If yes, the first device determines that a second device in the awake state exists in the device group that the first device is in. If no, the first device determines that a second device in the awake state does not exist in the device group that the first device is in, where the second device is a device that transmits a response message to the first device.

The first device may also determine the number of second device in the awake state in the device group according to the number of response message received within the second preset time interval. For example, the first device receives N response messages corresponding to different transmitting devices within the second preset time interval, then the first device may determine that N second devices in the awake state exist in the device group, where N is an integer.

S203, the first device transmits operation information of the first device to the second device, and receives operation information of the second device transmitted by the second device.

With respect to any one of the first device and the second device, operation information of a device includes at least one of the following information:

first indication information, where the first indication information is used to indicate whether the device is providing a smart service;

second indication information, where the second indication information is used to indicate whether the device provided a smart service within a first preset time interval;

the signal-to-noise ratio and/or the power value when receiving the awaking word.

In a possible implementation, a smart service may be a smart question and answer service, a smart query service or the like.

In a possible implementation, the first preset time interval may be a time interval before the current time, for example, the first preset time interval may be 5 minutes or 10 minutes before the current time or the like.

For example, the first indication information in the operation information of the first device is used to indicate whether the first device is providing a smart service. The first indication information in the operation information of the second device is used to indicate whether the second device is providing a smart service.

For example, the second indication information in the operation information of the first device is used to indicate whether the first device provided a smart service within the first preset time interval. The second indication information in the operation information of the second device is used to indicate whether the second device provided a smart service within the first preset time interval.

The signal-to-noise ratio when receiving the awaking word by a device (the first device or the second device) is directed to the ratio of the effective sound signal to the noise signal received by the device. Assuming that the awaking word is vocalized by a user, then a higher signal-to-noise ratio when receiving the awaking word by a device indicates that the device is closer to the user, and a lower signal-to-noise ratio when receiving the awaking word by the device indicates that the device is farther from the user.

The power value when receiving the awaking word by a device (the first device or the second device) may reflect the distance between the device and the user, a higher power value when receiving the awaking word by the device indicates that the device is closer to the user, and a lower power value when receiving the awaking word by the device indicates that the device is farther from the user.

S204, the first device determines, according to the operation information of the first device and the operation information of the second device, a target device from the first device and the second device.

Where the target device is the device in the device group to provide a smart service.

In a possible implementation, the first device may determine the target device from the first device and the second device according to a preset policy, the operation information of the first device and the operation information of the second device. The preset policy is directed to a policy to determine the target device according to the operation information of the first device and the operation information of the second device, namely, the preset policy is used to indicate a method to determine the target device according to the operation information of the first device and the operation information of the second device.

For example, the preset policy may be: determining preferentially a device which is providing a smart service as the target device. When a device which is providing a smart service does not exist, determining preferentially a device which provided a smart service within the first preset time interval as the target device. When a device which provided a smart service within the first preset time interval does not exist, determining a device closest to the user as the target device.

For example, the preset policy may be: determining preferentially a device which provided a smart service within the first preset time interval and is not currently providing a smart service as the target device. If the device which provided a smart service within the first preset time interval and is not currently providing a smart service does not exist, determining preferentially a device which is providing a smart service as the target device. When a device which is providing a smart service does not exist, determining a device closest to the user as the target device.

It should be noted that, the above merely indicates a preset policy in the form of an example, rather than put limit to the preset policy, in a practical application, the preset policy may be set according to practical needs, which is not specifically limited in the embodiments of the present disclosure.

If the first device is the target device, then the first device may receive a smart service request message input by a user, and provide a smart service to the user according to the smart service request message, in which case, the second device may switch the device state to the stand-by state. In a possible implementation, the first device may also output guidance information, and the guidance information is used to indicate: the first device and the second device both received the awaking word and played the response information corresponding to the awaking word, and a smart service is provided by the first device. The first device may play the guidance information in the form of a voice, or display the guidance information on the screen of the first device in the form of texts. In this way, the user may know the working manner of the devices in the device group, to prevent the user from mistakenly thinking that some of the devices are faulty. In a possible implementation, if a device in the device group is associated to a terminal device (for example, a cellphone, a computer or the like) of the user, then the guidance information may also be output by the terminal device of the user.

If the first device is not the target device, then the first device may switch the device state to the stand-by state, in which case, the target device may receive a smart service request message input by a user, and provide a smart service to the user according to the smart service request message.

S205, the first device determines the first device as the target device.

Since the first device is the target device, the first device may receive a smart service request message input by a user, and provide a smart service to the user according to the smart service request message.

According to the smart service method provided in the embodiments of the present disclosure, the first device plays the response information corresponding to the awaking word after receiving the awaking word, when the first device determines that a second device in the awake state exists in the device group that the first device is in, the first device transmits the operation information of the first device, and receives the operation information of the second device transmitted by the second device, the first device determines, according to the operation information of the first device and the operation information of the second device, a target device from the first device and the second device, and the target device is a device that provides a smart service in the device group. In the above process, multiple devices in the device group, after being awoken simultaneously by the awaking word, may intercommunicate to determine one target device, and the smart service is provided by the one target device, instead of being provided by the multiple smart devices awoken simultaneously to the user. In this way, not only the resources are economized, but also the service interference, which is caused when multiple smart devices provide smart services simultaneously to a user, is avoided.

On the basis of any of the above embodiments, a method for determining the target device from the first device and the second device is described below in combination with FIG. 3. For details, referring to the embodiment shown in FIG. 3.

Figure 3:
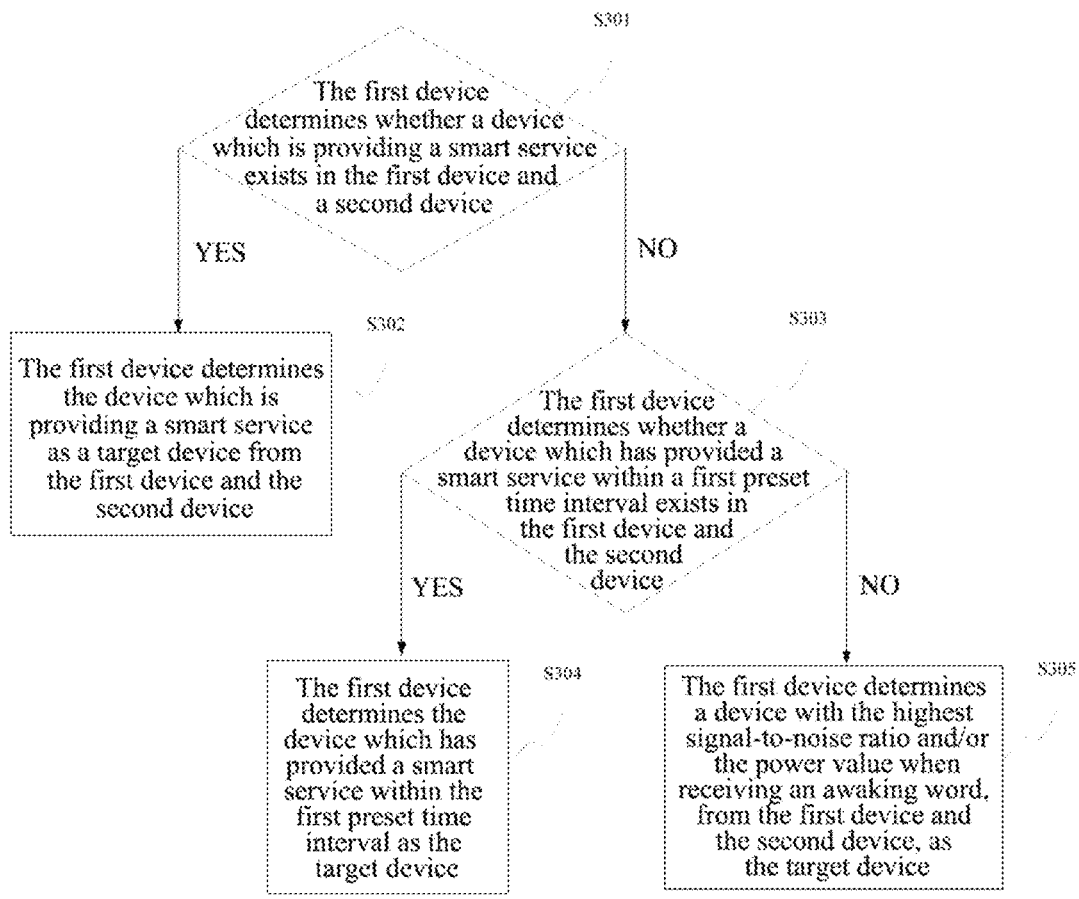
FIG. 3 is a schematic flowchart of a method for determining a target device provided by an embodiment of the present disclosure.

FIG. 3 is a schematic flowchart of a method for determining a target device provided by an embodiment of the present disclosure. Referring to FIG. 3, the method may include:

S301, the first device determines, according to the operation information of the first device and the operation information of the second device, whether a device which is providing a smart service exists in the first device and the second device.

If yes, executes S302.

If no, executes S303-S305.

In a possible implementation, the first device may determine, according to the first indication information in the operation information of the first device and the first indication information in the operation information of the second device, whether a device which is providing a smart service exists in the first device and the second device.

S302, the first device determines the device which is providing a smart service as the target device from the first device and the second device.

The first device may firstly obtain the number of the device which is providing a smart service, the number of the device which is providing a smart service may be one, or may be multiple.

If the number of the device which is providing a smart service in the first device and the second device is one, then the first device determines the device which is providing a smart service as the target device, such that the device that provides a smart service to a user is relatively close to the user, therefore providing better service to the user. Or, any device in the devices which are providing smart services may be determined as the target device, in this way, the target device may be determined promptly.

If the number of the devices which are providing smart services in the first device and the second device is more than one, then the first device determines the device with the highest signal-to-noise ratio and/or the power value when receiving the awaking word as the target device, from the devices which are providing smart services, as the target device.

S303, the first device determines, according to the operation information of the first device and the operation information of the second device, whether a device which has provided a smart service within the first preset time interval exists in the first device and the second device.

If yes, executes S304.

If no, executes S305.

In a possible implementation, the first device may determine, according to a second indication information in the operation information of the first device and a second indication information in the operation information of the second device, whether a device which has provided a smart service within the first preset time interval exists in the first device and the second device.

S304, the first device determines the device which has provided a smart service within the first preset time interval as the target device.

In a possible implementation, the first device may firstly obtain the device which has provided a smart service within the first preset time interval, the number of the device which has provided a smart service within the first preset time interval may be one, or may be multiple.

If the number of the device which has provided the smart service within the first preset time interval is one, then the first device determines the device which has provided the smart service within the first preset time interval as the target device.

If the number of the devices which have provided the smart service within the first preset time interval is more than one, then the first device determines, the device with the highest signal-to-noise ratio and/or the power value when receiving the awaking word, from the devices which have provided the smart service, as the target device, such that the device that provides a smart service to a user is relatively close to the user, therefore providing better service to the user. Or, any device in the devices which provided smart services within the first preset time interval may be determined as the target device, in this way, the target device may be determined promptly.

S305, the first device determines a device with the highest signal-to-noise ratio and/or the power value when receiving the awaking word, from the first device and the second device, as the target device.

In the embodiment shown in FIG. 3, the device which is providing a smart service is determined preferentially as the target device, In this way, it not only meets the user's needs for awaking a smart device (namely, a user is more inclined to request a smart device which is working to provide a smart service thereto), but also avoids the service interference caused by multiple smart devices providing smart services (which may be different smart services) simultaneously. When a device which is providing a smart service does not exist to be determined as the target device, a device which provided a smart service in the first preset time interval is determined preferentially as the target device. Due to the continuity of the user's use of the device, the user usually does not wish to change the device engaged in interaction in a short time, therefore, determining a device which provided a smart service in the first preset time interval as the target device is more in line with the usage requirements of a user for the device. When a device which provided a smart service in the first preset time interval does not exist, the device closest to the user (the device with the highest signal-to-noise ratio and/or the power value when receiving the awaking word) is determined as the target device, such that the device to provide the smart service to the user is relatively close to the user, which permitting a higher quality of the smart service provided to the user.

On the basis of any of the above embodiments, the technical solutions shown in the embodiments of the present disclosure will be described below in detail in combination with FIG. 4 through specific examples.

Figure 4:
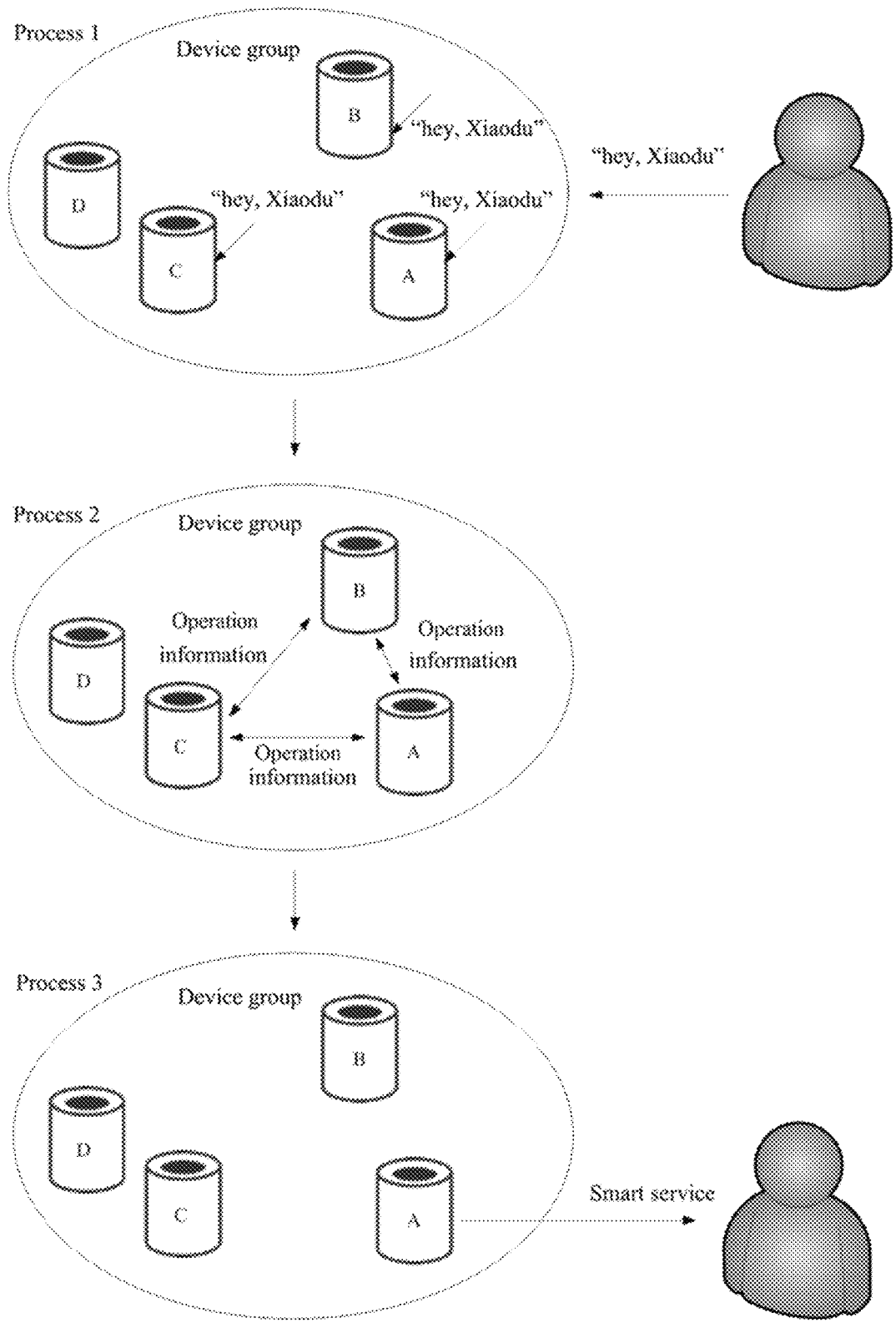
FIG. 4 is a schematic illustration of the processes of a smart service provided by an embodiment of the present disclosure.

According to an embodiment of the present disclosure, FIG. 4 is a schematic illustration of the processes of a smart service provided by an embodiment of the present disclosure, referring to FIG. 4, including process 1, process 2 and process 3.

Referring to the process 1, the device group includes 4 smart devices, which are respectively indicated by smart device A, smart device B, smart device C and smart device D. When a smart service is needed by a user, the user vocalizes the awaking word "hey, Xiaodu", assuming that the smart device A, the smart device B and the smart device D received the awaking word, then the smart device A, the smart device B and the smart device C would set the device state to the awake state, and play respectively the response information "here", which is corresponding to the awaking word. Based on the "here" played by the smart device A, the smart device B and the smart device C, the user would know clearly that none of the smart device A, the smart device B and the smart device C has failed.

Referring to the process 2, each smart device of the smart device A, the smart device B and the smart device C may transmit a request message to other smart devices in the device group respectively, and receives response message corresponding to other smart devices to determine the smart devices which are in the awake state in the device group. For example, the smart device A transmits a request message to the smart device B, the smart device C and the smart device D respectively, since the smart device B and the smart device C are in the awake state, the smart device A may receive response messages from the smart device B and the smart device C, and determines that the smart device A, the smart device B and the smart device C are in the awake state according to the response messages. For the same reason, the smart device A, the smart device B and the smart device C can all determine that the smart device A, the smart device B and the smart device C are in the awake state. Each of the smart device A, the smart device B and the smart device C may transmit operation information to other devices in the awake state, for example, the smart device A transmits the operation information of the smart device A to the smart device B and the smart device C respectively, the smart device B transmits the operation information of the smart device B to the smart device A and the smart device C respectively, the smart device C transmits the operation information of the smart device C to the smart device A and the smart device B respectively. The smart device A, the smart device B and the smart device C may determine, according to the operation information of the three devices, the target device among the three devices (referring to the process shown in the above embodiments). Since the operation information of the three devices that the smart device A, the smart device B and the smart device C receives are the same, and preset policies (the manner for determining the target device) of the three devices are the same, therefore, the target device determined by the smart device A, the smart device B and the smart device C are the same.

Referring to the process 3, assuming that the target device determined is the smart device A, then the smart device A provides a smart service to the user. For example, the user says play song 1, then the smart device A may play the song 1. The smart device B and the smart device C may switch the device state to the stand-by state.

Figure 5:
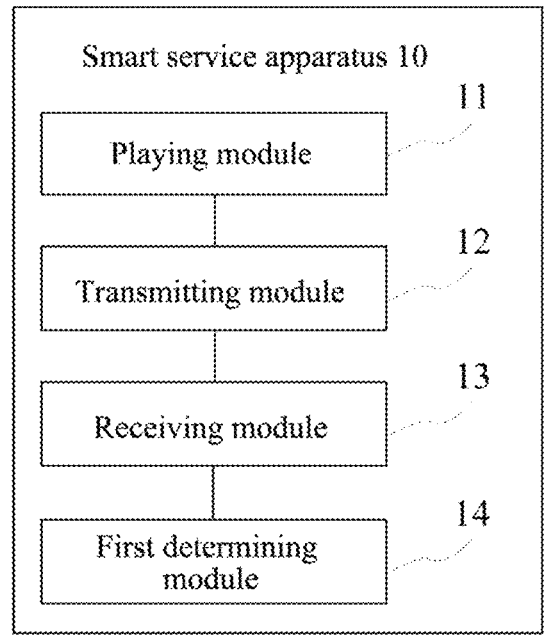
FIG. 5 is a schematic structural diagram of a smart service apparatus provided by an embodiment of the present disclosure.

FIG. 5 is a schematic structural diagram of a smart service apparatus provided by an embodiment of the present disclosure. Referring to FIG. 5, the smart service apparatus 10 may be applied to the first device, the smart service apparatus 10 includes a playing module 11, a transmitting module 12, a receiving module 13 and a first determining module 14, where, the playing module 11 is configured to play response information corresponding to an awaking word, after the awaking word is received;

the transmitting module 12 is configured to, when it is determined that a second device in an awake state exists in a device group that the first device is in, transmit operation information of the first device to the second device;

the receiving module 13 is configured to, when it is determined that a second device in an awake state exists in a device group that the first device is in, receive operation information of the second device transmitted by the second device;

the first determining module 14 is configured to determine, according to the operation information of the first device and the operation information of the second device, a target device in the first device and the second device, where the target device is a device in the device group to provide a smart service.

The smart service apparatus according to the embodiments of the present disclosure can execute the technical solutions shown in the foregoing method embodiments, and the implementation principles and beneficial effects thereof are similar, which will not be detailed herein again.

In a possible implementation, for any one of the first device and the second device, operation information of a device includes at least one of the following information:

first indication information, which is used to indicate whether the device is providing a smart service;

second indication information, which is used to indicate whether the device provided a smart service within a first preset time interval;

a signal-to-noise ratio and/or a power value when receiving the awaking word.

In a possible implementation, the first determining module 14 is specifically configured to:

determine, according to the operation information of the first device and the operation information of the second device, whether a device which is providing a smart service exists from the first device and the second device;

if yes, determine, the device which is providing a smart service in the first device and the second device as the target device;

if no, determine, according to the operation information of the first device and the operation information of the second device, whether a device which has provided a smart service within the first preset time interval exists in the first device and the second device, if yes, determine the device which has provided a smart service within the first preset time interval as the target device, if no, determine the device with the highest signal-to-noise ratio and/or the power value when receiving the awaking word as the target device from the first device and the second device.

In a possible implementation, the first determining module 14 is specifically configured to:

if the number of the device which is providing a smart service in the first device and the second device is one, determine the device which is providing a smart service as the target device;

if the number of devices which are providing a smart service in the first device and the second device is more than one, determine, a device with the highest signal-to-noise ratio and/or the power value when receiving the awaking word, from the devices which are providing a smart service, as the target device.

In a possible implementation, the first determining module 14 is specifically configured to:

if the number of the device which has provided a smart service within the first preset time interval is one, determine the device which has provided a smart service within the first preset time interval as the target device;

if the number of devices which have provided a smart service within the first preset time interval is more than one, determine the device with the highest signal-to-noise ratio and/or the power value when receiving the awaking word, from the devices which have provided a smart service, as the target device.

Figure 6:
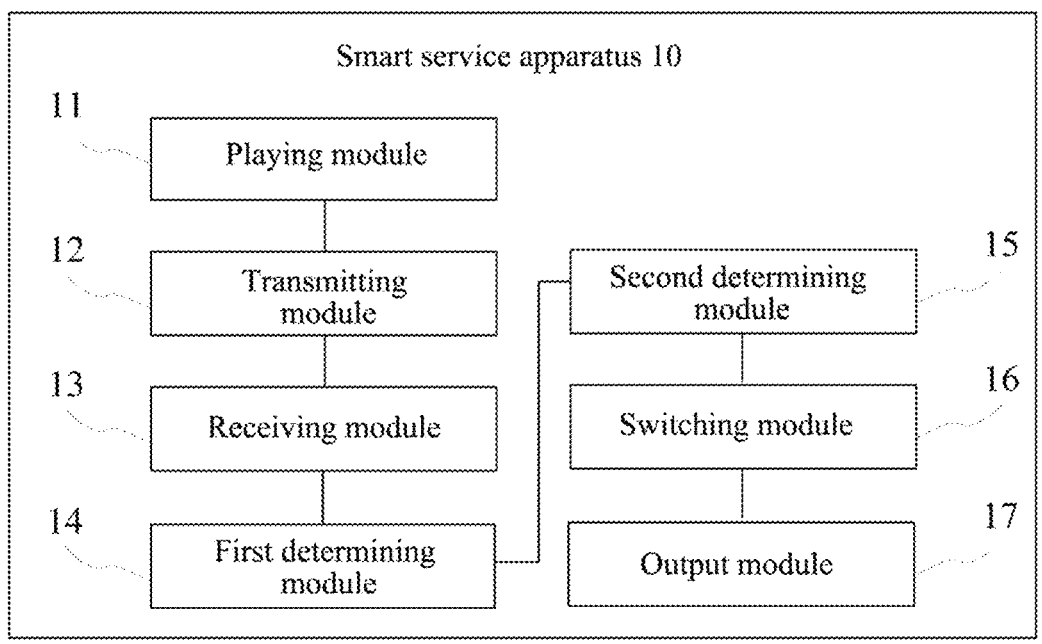
FIG. 6 is a schematic structural diagram of another smart service apparatus provided by an embodiment of the present disclosure.

FIG. 6 is a schematic structural diagram of another smart service apparatus provided by an embodiment of the present disclosure. On the basis of the embodiments shown in FIG. 5, referring to FIG. 6, the smart service apparatus 10 may further include a second determining module 15, the transmitting module 12 is further configured to transmit a request message to other device in the device group;

the second determining module 15 is configured to, if a response message is received by the receiving module 13 within a second preset time interval, determine that a second device in the awake state exists in the device group that the first device is in.

In a possible implementation, the second device is a device that transmits the response message to the first device within the second preset time interval.

In a possible implementation, the smart service apparatus 10 further includes a switching module 16, where, the receiving module 13 is further configured to, if the first device is the target device, receive a smart service request message input by a user, and provide a smart service to the user according to the smart service request message;

the switching module 16 is configured to, if the first device is not the target device, switch a device state to a stand-by state.

In a possible implementation, the smart service apparatus 10 further includes an output module 17, where, the output module 17 is configured to, after the first determining module 14 determines, according to the operation information of the first device and the operation information of the second device, a target device from the first device and the second device, if the first device is the target device, output guidance information, where the guidance information is used to indicate: the first device and the second device both received the awaking word and played the response information corresponding to the awaking word, and the first device is to provide a smart service.

The smart service apparatus according to the embodiments of the present disclosure can execute the technical solutions shown in the foregoing method embodiments, and the implementation principles and beneficial effects thereof are similar, which will not be detailed herein again.

Figure 7:
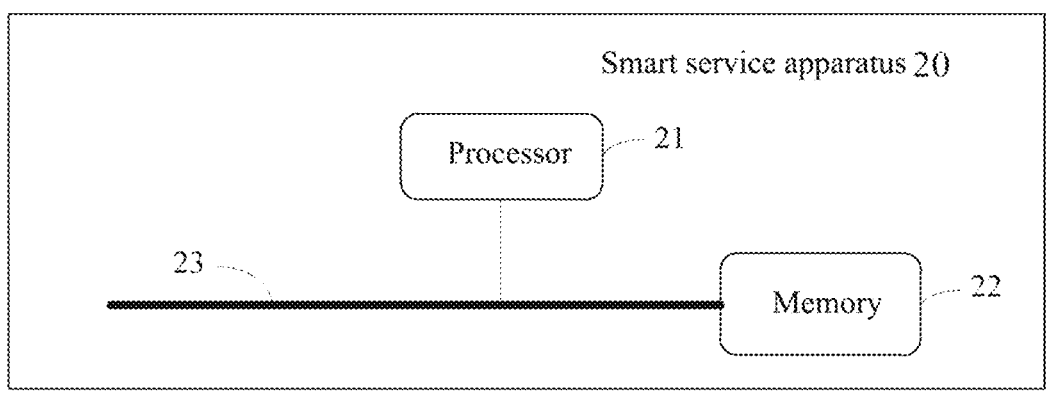
FIG. 7 is a schematic diagram of hardware structure of a smart service apparatus provided by an embodiment of the present disclosure.

FIG. 7 is a schematic diagram of hardware structure of a smart service apparatus provided by an embodiment of the present disclosure. As shown in FIG. 7, the smart service apparatus 20 includes: at least one processor 21 and a memory 22, where, the processor 21 and the memory 22 are connected via bus 23.

In a specific implementation process, the at least one processor 21 executes the computer executable instructions stored by the memory 22 to thereby implement the foregoing smart service method.

The specific implementation of the processor 21 may be referred to the foregoing method embodiments, the implementation principles and technical effects thereof are similar, which will not be detailed herein again in the present embodiment.

In the embodiment shown in FIG. 7, it should be noted that, the processor may be a central processing unit (CPU), or may be other general-purpose processor, a digital signal processor (DSP), application specific integrated circuits (ASIC) etc. A general-purpose processor may be a microprocessor, or any conventional processor or the like. The steps of the method disclosed in connection with the disclosure may be directly embodied as being executed by a hardware processor, or being executed by a combination of hardware and software modules in the processor.

The memory may include a high-speed RAM memory, or may further include non-volatile storage (NVM), such as at least one disk memory.

The bus may be an Industry Standard Architecture (ISA) bus, a Peripheral Component (PCI) bus, or an Extended Industry Standard Architecture (EISA) bus. The bus can be divided into an address bus, a data bus, a control bus, and the like. For the convenience of representation, the bus in the drawings of the present disclosure is not limited to only one bus or one type of bus.

The present disclosure further provides a computer-readable storage medium storing thereon computer executable instructions which, when being executed by a processor, implement the smart service method described above.

The foregoing computer-readable storage medium may be implemented by any type of volatile or nonvolatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. A readable storage medium may be any available medium that can be accessed by a general purpose or special purpose computer.

An exemplary readable storage medium is coupled to the processor such that the processor can read information from, and write information to, the readable storage medium. As a matter of course, the readable storage medium may also be a component of the processor. The processor and the readable storage medium may be integrated in an application specific integrated circuit (ASIC). Or, the processor and the readable storage medium may also reside in a device as discrete components.

For example, the partition of the modules is only a logical function partition. There may be other manners for partition in a practical implementation, for example, multiple units or components may be combined with or integrated into another system, or some features may be omitted or not executed. In addition, the mutual coupling or direct coupling or communication connection shown or discussed may be an indirect coupling or communication connection through some interfaces, devices or units, which may be electrical, mechanical or otherwise.

The units described as discrete components may or may not be physically separated, a component shown as a unit may or may not be a physical unit, namely, it may be located in one place, or may be distributed in multiple network elements. Some or all of the units may be selected according to practical needs to achieve the purpose of the solution of the embodiments.

In addition, respective functional units in various embodiments of the present disclosure may be integrated in a processing unit, or respective units may exist physically alone, or two or more units can be integrated in one unit.

The function may be stored in a computer readable storage medium if being implemented in the form of a software functional unit and sold or used as a standalone product. Based on such understanding, the technical solutions of the present disclosure, substantively, or a part of which that makes a contribution to the prior art, or a part of which, may be embodied in the form of a software product, which is stored in a storage medium and includes a plurality of instructions to cause a computer device (which may be a personal computer, a server or a network device etc.) to execute all or part of the steps of the methods described in the various embodiments of the present disclosure. The foregoing storage medium includes: a USB flash disk, a mobile hard disk drive, a read-only memory (ROM), a random access memory (RAM), a magnetic disk or an optical disk, or other medium that can store program codes.

It is understood by those ordinary skilled in the art that all or part of the steps to implement the foregoing various method embodiments may be implemented by hardware associated with program instructions. The program may be stored in a computer readable storage medium. When the program is executed, the steps including the embodiments of the methods described above are implemented. The storage medium includes: ROM, ram, disk or optical disc or other media that can store program codes.

Finally, it should be noted that the above embodiments are only used to explain rather than limit the technical solutions of the present disclosure; although the present disclosure has been described in detail with reference to the foregoing embodiments, those ordinary skilled in the art should understand that modifications can be made to the technical solutions recorded in the foregoing embodiments, or some or all of the technical features thereof may be substituted by their equivalents, and such modifications or substitutions do not cause the nature of the corresponding technical solutions to deviate from the scope of the technical solutions of the embodiments of the present disclosure.

What is claimed is:

1. A smart service method, comprising:
    playing, by a first device, response information corresponding to an awaking word, after receiving the awaking word;
    when the first device determines that a second device in an awake state exists in a device group that the first device is in, transmitting, by the first device, operation information of the first device to the second device, and receiving operation information of the second device transmitted by the second device; wherein for any one of the first device and the second device, operation information of a device comprises second indication information, wherein the second indication information is used to indicate whether the device provided a smart service within a first preset time interval; and
    determining, by the first device, according to the operation information of the first device and the operation information of the second device, a target device from the first device and the second device, wherein the target device is a device in the device group to provide the smart service.

2. The method according to claim 1, wherein for any one of the first device and the second device, the operation information of a device further comprises at least one of the following information:
    first indication information, wherein the first indication information is used to indicate whether the device is providing the smart service; and
    at least one of a signal-to-noise ratio and a power value when receiving the awaking word.

3. The method according to claim 2, wherein the determining, by the first device, according to the operation information of the first device and the operation information of the second device, a target device from the first device and the second device, comprises:
    determining, by the first device, according to the operation information of the first device and the operation information of the second device, whether a device which is providing the smart service exists in the first device and the second device; and if a device which is providing the smart service exists in the first device and the second device, determining, by the first device, the device which is providing the smart service from the first device and the second device as the target device;

if a device which is providing the smart service does not exist in the first device and the second device, determining, by the first device, according to the operation information of the first device and the operation information of the second device, whether a device which has provided the smart service within the first preset time interval exists in the first device and the second device, if a device which has provided the smart service within the first preset time interval exists in the first device and the second device, determining, by the first device, the device which has provided the smart service within the first preset time interval as the target device, if a device which has provided the smart service within the first preset time interval does not exist in the first device and the second device, determining, by the first device, the device with at least one of the highest signal-to-noise ratio and the power value when receiving the awaking word as the target device from the first device and the second device.

4. The method according to claim 3, wherein the determining, by the first device, the device which is providing the smart service the first device and the second device as the target device, comprises:

if the number of the device which is providing the smart service in the first device and the second device is one, determining, by the first device, the device which is providing the smart service as the target device;

if the number of devices which are providing the smart service in the first device and the second device is more than one, determining, by the first device, a device with at least one of the highest signal-to-noise ratio and the power value when receiving the awaking word, from the devices which are providing the smart service, as the target device.

5. The method according to claim 3, wherein the determining a device which has provided the smart service within the first preset time interval as the target device, comprises:

if the number of the device which has provided the smart service within the first preset time interval is one, determining, by the first device, the device which has provided the smart service within the first preset time interval as the target device;

if the number of devices which have provided the smart service within the first preset time interval is more than one, determining, by the first device, the device with at least one of the highest signal-to-noise ratio and the power value when receiving the awaking word, from the devices which have provided the smart service, as the target device.

6. The method according to claim 1, wherein the first device determines that a second device in an awake state exists in a device group that the first device is in, comprises:

transmitting, by the first device, a request message to other device in the device group; and if a response message is received by the first device within a second preset time interval, determining, by the first device, that a second device in the awake state exists in the device group that the first device is in.

7. The method according to claim 6, wherein the second device is a device that transmits the response message to the first device within the second preset time interval.

8. The method according to claim 1, wherein after the determining, by the first device, according to the operation information of the first device and the operation information of the second device, a target device from the first device and the second device, further comprising:

if the first device is the target device, receiving, by the first device, the smart service request message input by a user, and providing the smart service to the user according to the smart service request message;

if the first device is not the target device, switching, by the first device, a device state to a stand-by state.

9. The method according to claim 1, wherein after the determining, by the first device, according to the operation information of the first device and the operation information of the second device, a target device from the first device and the second device, further comprising:

if the first device is the target device, outputting, by the first device, guidance information, wherein the guidance information is used to indicate: the first device and the second device both received the awaking word and played the response information corresponding to the awaking word, and the first device is to provide the smart service.

10. A smart service apparatus which is applied to a first device, comprising: at least one processor and a memory, the memory storing thereon instructions executable by the at least one processor, wherein the at least one processor is configured to:

play response information corresponding to an awaking word, after the awaking word is received;

when it is determined that a second device in an awake state exists in a device group that the first device is in, transmit operation information of the first device to the second device;

when it is determined that a second device in an awake state exists in a device group that the first device is in, receive operation information of the second device transmitted by the second device;

wherein for any one of the first device and the second device, operation information of a device comprises second indication information, wherein the second indication information is used to indicate whether the device provided a smart service within a first preset time interval; and determine, according to the operation information of the first device and the operation information of the second device, a target device from the first device and the second device, wherein the target device is the device in the device group to provide the smart service.

11. The apparatus according to claim 10, wherein for any one of the first device and the second device, the operation information of a device further comprises at least one of the following information:

first indication information, wherein the first indication information is used to indicate whether the device is providing the smart service; and at least one of a signal-to-noise ratio and a power value when receiving the awaking word.

12. The apparatus according to claim 11, wherein the at least one processor is configured to:

determine, according to the operation information of the first device and the operation information of the second device, whether a device which is providing the smart service exists in the first device and the second device; and if a device which is providing the smart service exists in the first device and the second device, determine, the device which is providing the smart service from the first device and the second device as the target device;

if a device which is providing the smart service does not exist in the first device and the second device, determine, according to the operation information of the first device and the operation information of the second device, whether a device which has provided the smart service within the first preset time interval exists in the first device and the second device, if a device which has provided the smart service within the first preset time interval exists in the first device and the second device, determine the device which has provided the smart service within the first preset time interval as the target device, if a device which has provided the smart service within the first preset time interval does not exist in the first device and the second device, determine the device with at least one of the highest signal-to-noise ratio and the power value when receiving the awaking word as the target device from the first device and the second device.

13. The apparatus according to claim 12, wherein the at least one processor is configured to:

if the number of the device which is providing the smart service in the first device and the second device is one, determine the device which is providing the smart service as the target device;

if the number of devices which are providing the smart service in the first device and the second device is more than one, determine, a device with at least one of the highest signal-to-noise ratio and the power value when receiving the awaking word, from the devices which are providing the smart service, as the target device.

14. The apparatus according to claim 12, wherein the at least one processor is configured to:

if the number of the device which has provided the smart service within the first preset time interval is one, determine the device which has provided the smart service within the first preset time interval as the target device;

if the number of devices which have provided the smart service within the first preset time interval is more than one, determine, the device with at least one of the highest signal-to noise ratio and the power value when receiving the awaking word, from the devices which have provided the smart service, as the target device.

15. The apparatus according to claim 10, the at least one processor is configured to:

transmit a request message to other device in the device group; and if a response message is received within a second preset time interval, determine that a second device in the awake state exists in the device group that the first device is in.

16. The apparatus according to claim 15, wherein the second device is a device that transmits the response message to the first device within the second preset time interval.

17. The apparatus according to claim 10, wherein the at least one processor is configured to:

if the first device is the target device, receive the smart service request message input by a user, and provide the smart service to the user according to the smart service request message;

if the first device is not the target device, switch a device state to a stand-by state.

18. The apparatus according to claim 10, the at least one processor is configured to:

after determining, according to the operation information of the first device and the operation information of the second device, a target device from the first device and the second device, if the first device is the target device, output guidance information, wherein the guidance information is used to indicate: the first device and the second device both received the awaking word and played the response information corresponding to the awaking word, and the first device is to provide the smart service.

19. A non-transitory computer-readable storage medium, storing thereon computer executable instructions which, when being executed by a processor, implement the smart service method according to claim 1.

* * * * *